US008000214B2

(12) United States Patent
Lantz et al.

(10) Patent No.: US 8,000,214 B2
(45) Date of Patent: Aug. 16, 2011

(54) HERMETIC SEAL FOR A SCANNER ASSEMBLY OF A PROBE STORAGE DEVICE

(75) Inventors: Mark A. Lantz, Adliswil (CH); Hugo E. Rothuizen, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 814 days.

(21) Appl. No.: 11/955,530

(22) Filed: Dec. 13, 2007

(65) Prior Publication Data
US 2009/0153915 A1    Jun. 18, 2009

(51) Int. Cl.
*G11B 9/00* (2006.01)
(52) U.S. Cl. ....................................................... 369/126
(58) Field of Classification Search .................. 369/126; 345/145; 977/943, 947
See application file for complete search history.

(56) References Cited

U.S. PATENT DOCUMENTS

| | | | |
|---|---|---|---|
| 5,834,864 A | 11/1998 | Hestermann et al. | |
| 5,986,381 A | 11/1999 | Hoen et al. | |
| 6,411,589 B1* | 6/2002 | Hoen et al. | 369/126 |
| 6,583,524 B2 | 6/2003 | Brandt | |
| 6,590,850 B2* | 7/2003 | Eldredge et al. | 369/101 |
| 6,639,313 B1 | 10/2003 | Martin et al. | |
| 6,953,985 B2 | 10/2005 | Lin et al. | |
| 7,050,320 B1* | 5/2006 | Lai et al. | 365/63 |
| 7,132,721 B2 | 11/2006 | Platt et al. | |
| 2003/0057803 A1 | 3/2003 | Hartwell | |
| 2004/0245462 A1* | 12/2004 | Binnig et al. | 250/306 |
| 2008/0229577 A1* | 9/2008 | Heck | 29/884 |

OTHER PUBLICATIONS

J. Fernando Alfaro and Gary K. Fedder, Actuation for Probe-Based Mass Data Storage, in Techical Proceedings of the Fifth International Conference of Modeling and Simulation of Microsystems (MSM '02), Apr. 22-25, 2002, pp. 202-205, San Juan Puerto Rico.
Y. Lu et al., Design, Fabrication and Control of a Micro X-Y Stage with Large Ultra-thin Film Recoding Media Platform, Proceedings of the 2005 IEEE/ASME International Conference on Advanced Intelligent Mechatronics, Jul. 2005, p. 19-24, Monterey.
Mark A. Lantz et al., A Vibration Resistant Nanopositioner for Mobile Parallel-Probe Storage Applications, Journal for Microelectronical Systems, Feb. 2007, p. 130-139, vol. 16, No. 1, IEEE.

* cited by examiner

*Primary Examiner* — Joseph Haley
*Assistant Examiner* — Nicholas Lee
(74) *Attorney, Agent, or Firm* — Cantor Colburn LLP; Stephen Kaufman

(57) ABSTRACT

A scanner assembly includes a first sealing ring that extends around one of first and second actuating mechanisms of the scanner assembly. A first sealant ring is positioned upon the first sealing ring and is formed from one of a solder seal, glass frit seal and a glue seal. The first sealant ring provides a hermetic seal that maintains a desired operating environment for the one of the first and second actuating mechanisms and a mechanical support for a top plate. A second sealing ring extends around a media table of the scanner assembly. A second sealant ring is positioned upon the second sealing ring and is formed from one of a solder seal, glass frit seal and a glue seal. The second sealing ring provides a hermetic seal that maintains a desired operating environment for the media table and a mechanical support for an array chip.

4 Claims, 3 Drawing Sheets

HERMETIC SEAL FOR A SCANNER ASSEMBLY OF A PROBE STORAGE DEVICE

BACKGROUND OF THE INVENTION

1. Field of the Invention

This invention relates to the art of probe storage devices and, more particularly, to a hermetic seal for a scanner assembly of a probe storage device.

2. Description of Background

Parallel probe-based data-storage systems are currently being developed for future data-storage applications. A parallel probe-based system employs a large array of atomic-force microscopic probes that read, write and erase data on a storage medium carried by an X/Y scanning system. The large array of probes enables very high storage densities to be achieved. Moreover, by operating the array of probes in parallel, high data transfer rates are also achievable. The high storage capacity, combined with rapid transfer rates, enables the storage system to be built into a small package that is ideal for mobile storage applications.

Mobile storage systems present a variety of engineering challenges. First, mobile storage systems must be robust against vibration and shock. Second, mobile storage systems must be capable of operating on a restricted power budget. A mobile probe based storage system should be capable of maintaining sub-nanometer tracking performance while being subjected to mechanical shocks that create accelerations that approach 10's of g's. However, making a mechanical device more robust, i.e., capable of withstanding high accelerations, typically requires making components stiffer. By making the components stiffer, power consumption for certain components, e.g., actuators, will increase thereby rendering the device less desirable for mobile applications.

In addition, it is desirable to maintain a particular operating environment for the storage system. That is, operating performance of the storage device is directly related to composition and/or pressure of the operating environment. Therefore, it is necessary to incorporate various seals in the storage device to maintain a particular environment for certain components. The seals contribute to a need for a larger package size for the storage device. At present, micro-electro-mechanical system (MEMS) level hermetic sealing is not possible for use in existing scanners.

SUMMARY OF THE INVENTION

The shortcomings of the prior art are overcome and additional advantages are provided by a scanner assembly for a probe storage device. The scanner assembly includes a base plate having a main body that defines a substantially planar surface, the base plate including at least one magnet receiving portion and at least one magnet positioned in the at least one magnet receiving portion. The scanner assembly also includes first and second top plates. Each of the first and second top plates includes a main body portion that defines a substantially planar surface, and a magnet receiving section including a magnet. A first actuating mechanism is positioned between the first top plate and the base plate. A second actuating mechanism is positioned between the second top plate and the base plate. A suspension layer arranged between the at least one top plate and the base plate and a table layer arranged upon the suspension layer. The scanner assembly further includes a media table formed in the table layer. The media table is operatively connected to each of the first and second actuating mechanisms and supported on the suspension layer. An array chip extends over and is positioned offset from the table layer. A first sealing ring is formed in the table layer and extends around one of the first and second actuating mechanisms. A first sealant ring is positioned upon the first sealing ring and is formed from one of a solder seal, a glass frit seal and a glue seal. The first sealant ring provides a hermetic seal that maintains a desired operating environment for the first actuating mechanism and a mechanical support for a corresponding one of the first and second top plates. A second sealing ring is formed in the table layer and extends around the media table. A second sealant ring is positioned upon the second sealing ring and is formed from a solder seal, a glass frit seal and a glue seal. The second sealant ring provides a hermetic seal that maintains a desired operating environment for the media table and a mechanical support for the array chip.

Additional features and advantages are realized through the techniques of exemplary embodiments of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the exemplary embodiments of the invention, together with advantages and features, by way of example with reference to the drawings.

DETAILED DESCRIPTION OF THE INVENTION

Figure 1:
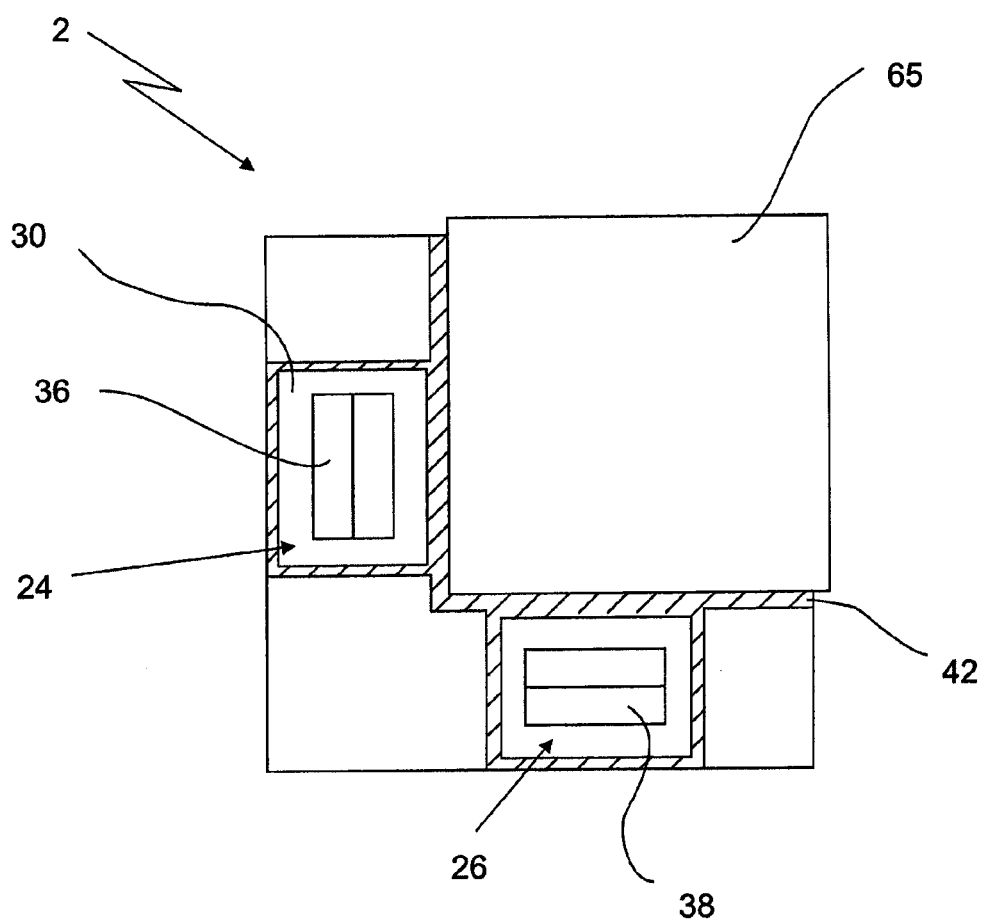
FIG. 1 is top plan view of a scanner assembly for a probe storage system including a hermetic seal constructed in accordance with an exemplary embodiment of the present invention.
Figure 2:
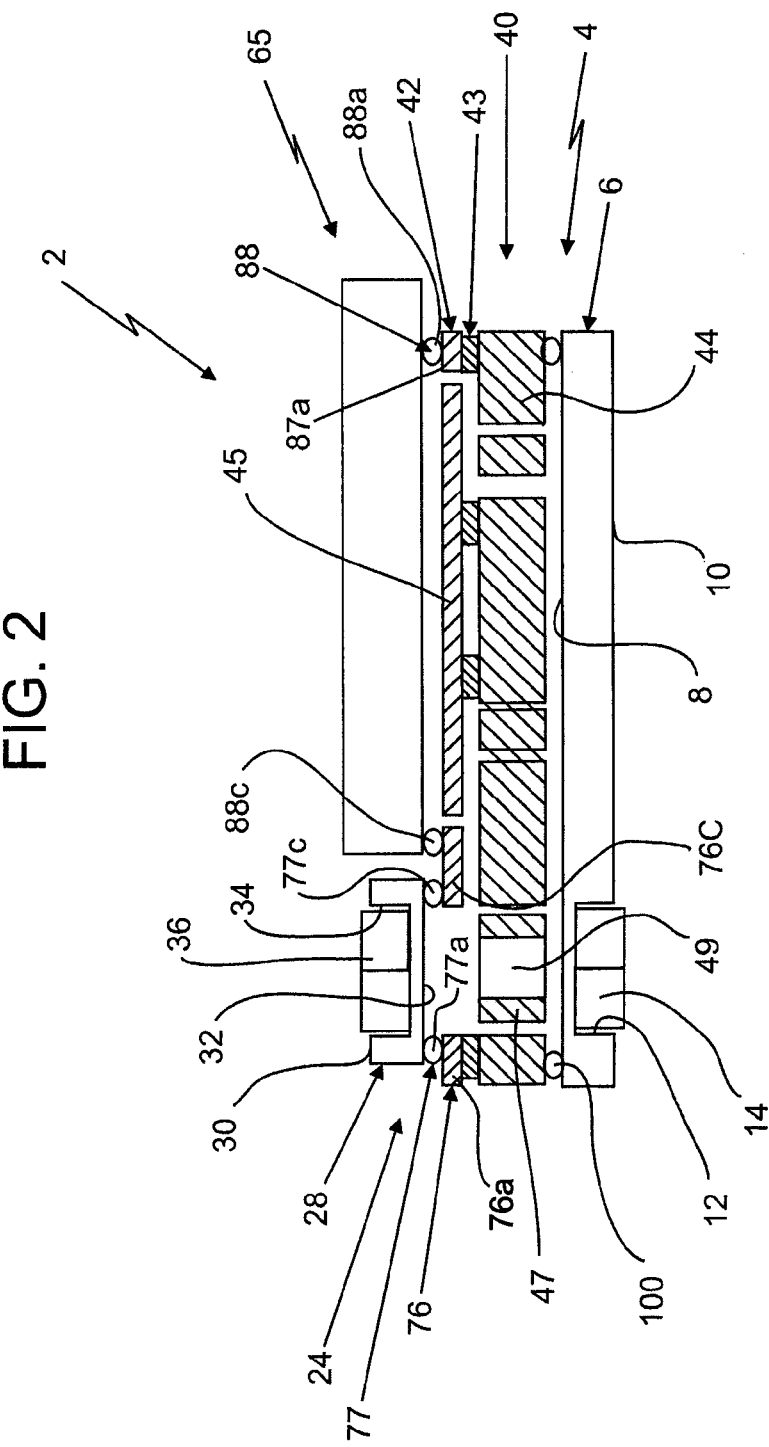
FIG. 2 is a cross-sectional side view of the scanner assembly of FIG. 1.

With initial reference to FIGS. 1 and 2, a scanner assembly for a probe storage device constructed in accordance with an exemplary embodiment of the present invention is generally indicated at 2. Scanner assembly 2 includes a base plate 4 having a main body 6 that defines a first planar surface 8 and a second, opposing planar surface 10. Base plate 4 includes a magnet receiving portion 12 formed in main body 6 having arranged therein a magnet 14. Although not shown, base plate 4 includes another magnet receiving portion having an associated another magnet (also not shown). Scanner assembly 2 also includes first and second top plates 24 and 26.

As shown, top plate 24 includes a main body 28 that defines a first planar surface 30 and a second, opposing planar surface 32. Top plate 24 includes a magnet receiving section 34 having arranged therein a magnet 36. Top plate 24 is positioned relative to base plate 4 such that magnet 34 is spaced from, yet in vertical alignment with, magnet 14. At this point it should be understood that second top plate 26 is similarly formed and includes a corresponding magnet receiving section (not separately labeled) having arranged therein an associated magnet 38 that is spaced from, and in vertical alignment with, the another magnet provided in base plate 4. Scanner assembly 2 is also shown to include a scanner chip 40 having a table layer 42, a spacer layer 43 and a suspension layer 44. Scanner chip 40 is further shown to include a media table 45 that is formed in table layer 42. Media table 45 is supported upon suspension layer 44.

Scanner assembly 2 includes a first actuating mechanism 47 formed in suspension layer 44 and arranged between magnets 14 and 36. First actuating mechanism 47 includes a first coil 49 operatively connected to media table 45. Scanner assembly 2 also includes a second actuating mechanism 55 (see FIG. 3) arranged between magnet 38 and the another magnet (not shown) in base plate 4. In a manner similar to that described above, the second actuating mechanism includes a second coil (not shown) operatively connected to media table 45. First and second actuating mechanisms 47 and 55 are selectively activated to shift media table 45 along first and second orthogonal axes to a desired position defined by an X/Y plane relative to a plurality of parallel probes (not shown) positioned on array chip 65. Array chip 65 extends over and is positioned offset from table layer 42.

Figure 3:
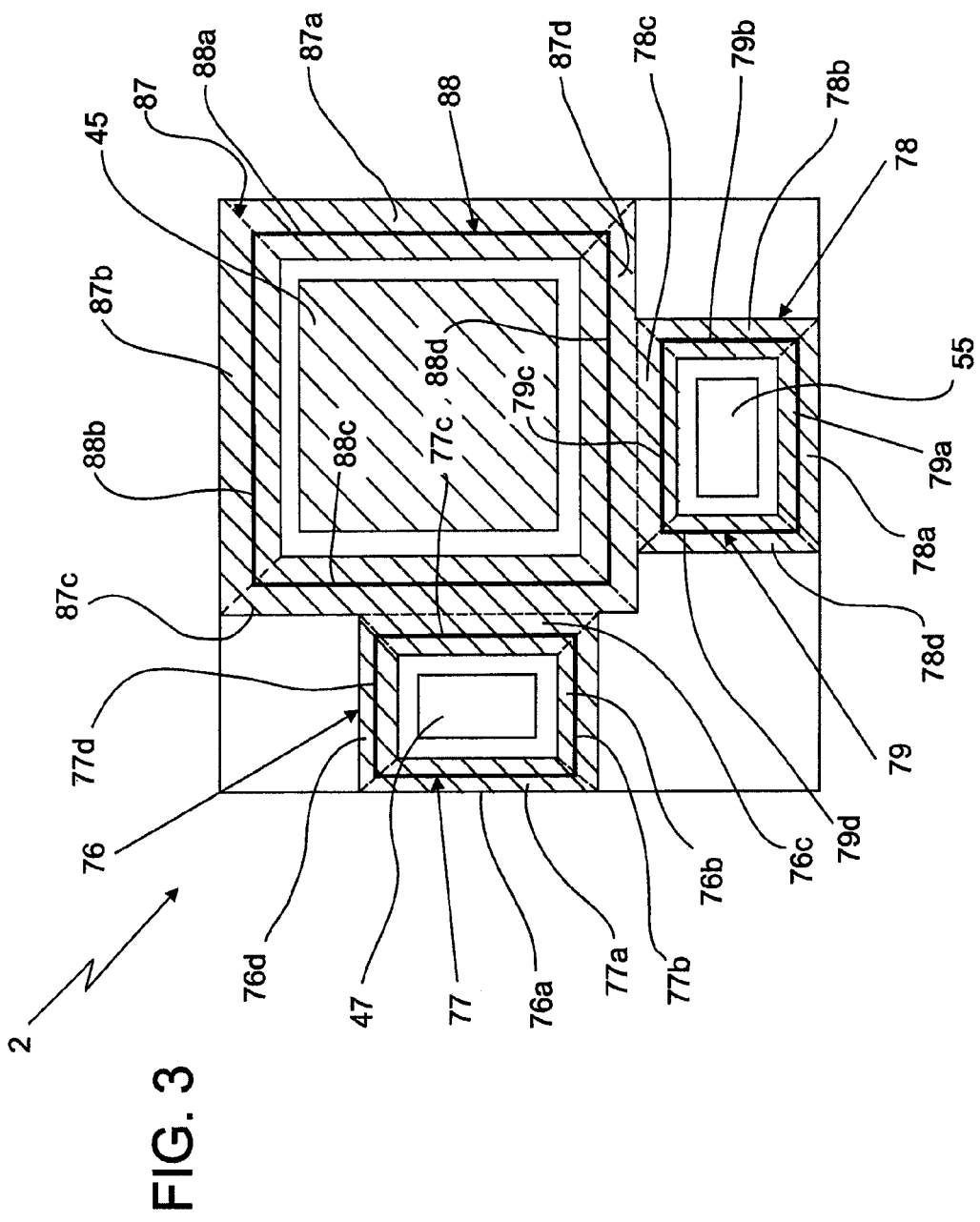
FIG. 3 is a top plan view a scanner assembly for a probe storage system shown without top plates and an array chip to illustrate a hermetic seal constructed in accordance with an exemplary embodiment of the present invention.

Reference will now be made to FIG. 3 in describing an exemplary embodiment of the present invention. As shown, scanner assembly 2 includes a first sealing ring 76 formed in table layer 42. First sealing ring 76 includes a first segment 76a that extends to a second segment 76b. Second segment 76b extends to a third segment 76c, which leads to a fourth segment 76d. Fourth segment 76d terminates at first segment 76a so as to form a continuous, uninterrupted seal that extends about actuating mechanism 47. In addition, scanner assembly 2 includes a first sealant ring 77 that is positioned upon first sealing ring 76 and is formed from one of a solder seal, a glass frit seal and a glue seal. First sealant ring 77 includes a first segment 77a that extends to a second segment 77b. Second segment 77b leads to a third segment 77c. Third segment 77c extends to a fourth segment 77d, which terminates at first segment 77a so as to form a continuous, uninterrupted seal. First sealing ring 76 and first sealant ring 77 provide a hermetic seal for maintaining a predetermined, constant operating environment for actuating mechanism 47. The predetermined constant environment should have as low a humidity as possible and include an atmosphere having one of a dry nitrogen gas, a dry argon gas, a dry forming gas, e.g., a combination of argon and hydrogen, and dry air or combinations thereof.

In further accordance with the exemplary embodiment of the present invention, scanner assembly 2 includes a second sealing ring 78 that is formed in table layer 42 and extends about second actuating mechanism 55. Second sealing ring 78 includes a first segment 78a that extends to a second segment 78b. Second segment 78b extends to a third segment 78c, which leads to a fourth segment 78d. Fourth segment 78d terminates at first segment 78a so as to form a continuous, uninterrupted seal. A second sealant ring 79 is positioned upon second sealing ring 78 and is formed from one of a solder seal, a glass frit seal and a glue seal. Second sealant ring 79 includes a first segment 79a that extends to a second segment 79b. Second segment 79b leads to a third segment 79c. Third segment 79c extends to a fourth segment 79d, which terminates at first segment 79a so as to form a continuous, uninterrupted seal. Second sealing ring 78 and second sealant ring 79 provide a hermetic seal for maintaining a predetermined, constant operating environment for actuating mechanism 55.

In still further accordance with the exemplary embodiment, scanner assembly 2 includes a third sealing ring 87 that is formed in table layer 42 and extends about media table 45. Third sealing ring 87 includes a first segment 87a that extends to a second segment 87b. Second segment 87b extends to a third segment 87c, which leads to a fourth segment 87d. Fourth segment 87d terminates at first segment 87a so as to form a continuous, uninterrupted seal. Moreover, third segment 87c overlaps and is hermetically joined with third segment 76c of first sealing ring 76 and fourth segment 87d overlaps and hermetically joined with third segment 78c of second sealing ring 78. A third sealant ring 88 is positioned upon third sealing ring 87 and extends about media table 45. Third sealant ring 88 includes a first segment 88a that extends to a second segment 88b. Second segment 88b leads to a third segment 88c. Third segment 88c extends to a fourth segment 88d, which terminates at first segment 88a so as to form a continuous, uninterrupted seal. Third sealing ring 87 and third sealant ring 88 provide a hermetic seal for maintaining a predetermined, constant operating environment for media table 45.

In yet further accordance with the exemplary embodiment, scanner assembly 2 includes a fourth sealant ring 100 formed in a manner similar to that described above. Fourth sealant ring 100 extends about an outer periphery of base plate 4. Fourth sealant ring 100 provides a hermetic seal between base plate 4 and scanner chip 40. At this point it should be appreciated that the present invention embodiments provide a low profile hermetic seal that maintains a desired operating environment about various components of scanner assembly 2. More over, the first and second sealing rings not only provide a hermetic seal, but also mechanical support for top plates 24 and 26, and array chip 65 respectively. That is, scanner assembly 2 further includes a plurality of spacers (not shown) that establish a desired spacing between first, second, and third sealing rings 76 and 78 and 87 and top plates 24 and 26, and array chip 65. Furthermore, it should be understood that first, second an third sealing rings 76, 78 and 87 provide a micro-electro-mechanical system (MEMS) level hermetic seal without requiring an increase in size of scanner assembly 2. In this manner, scanner assembly 2 can be incorporated into a small package that is ideally suited for mobile data storage applications.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

The invention claimed is:

1. A scanner assembly for a probe storage device comprising:
   a base plate having a main body that defines a substantially planar surface, the base plate including at least one magnet receiving portion and at least one magnet positioned in the at least one magnet receiving portion;
   first and second top plates, each top plate including a main body portion that defines a substantially planar surface and a magnet receiving section including a magnet;
   a first actuating mechanism positioned between the first top plate and the base plate;
   a second actuating mechanism positioned between the second top plate and the base plate;
   a suspension layer arranged between the at least one top plate and the base plate;
   a table layer arranged upon the suspension layer;

a media table formed in the table layer, the media table being operatively connected to each of the first and second actuating mechanisms and supported on the suspension layer;

an array chip extends over and is positioned offset from the table layer;

a first sealing ring formed in the table layer and extending about an outer periphery of one of the first and second actuating mechanisms;

a first sealant ring positioned upon the first sealing ring and is formed from one of a solder seal, a glass frit seal and a glue seal, the first sealant ring providing a hermetic seal that maintains a desired operating environment for the one of the first and second actuating mechanisms and a mechanical support for a corresponding one of the first and second top plates; and a second sealing ring formed in the table layer and extending about an outer periphery of the media table;

a second sealant ring positioned upon the second sealing ring and is formed from one of a solder seal, a glass frit seal and a glue seal, the second sealant ring providing a hermetic seal that maintains a desired operating environment for the media table and a mechanical support for the array chip.

2. The scanner assembly according to claim 1, further comprising:

a third sealing ring extending about an outer periphery of the other of the first and second actuating mechanisms; and a third sealant ring positioned upon the third sealing ring, the third sealant ring being formed from one of a solder seal, a glass frit seal and a glue seal, the third sealant ring providing a hermetic seal that maintains a desired operating environment for the other of the first and second actuating mechanisms and a mechanical support for a corresponding one of the first and second top plates.

3. The scanner assembly according to claim 2, further comprising: a fourth sealing ring positioned between the suspension layer and the base plate, the fourth sealant ring providing a hermetic seal that maintains a desired operating environment for the media table and first and second actuating mechanisms as well as provides a mechanical support for the base plate.

4. The scanner assembly according to claim 2, wherein a portion of the second sealing ring overlaps a portion of the first sealing ring and the third sealing ring.

\* \* \* \* \*